United States Patent [19]

Curl

[11] Patent Number: 4,999,728
[45] Date of Patent: Mar. 12, 1991

[54] POWER SURGE PROTECTION CIRCUIT

[75] Inventor: Ricky L. Curl, Pinson, Ala.

[73] Assignee: Atlas Technology, Inc., Birmingham, Ala.

[21] Appl. No.: 315,596

[22] Filed: Feb. 27, 1989

[51] Int. Cl.5 .............................................. H02H 3/26
[52] U.S. Cl. ....................................... 361/33; 361/56; 361/60; 361/75; 361/111; 340/663
[58] Field of Search ....................... 361/58, 28, 29, 60, 361/74, 75, 86, 92, 100, 106, 110, 111, 118, 56; 340/663

[56] References Cited

U.S. PATENT DOCUMENTS

| | | | |
|---|---|---|---|
| 3,784,846 | 1/1974 | Krick et al. | 361/92 X |
| 4,394,702 | 7/1983 | Boothe | 361/92 |
| 4,415,943 | 11/1983 | Wortman | 361/92 X |
| 4,473,759 | 9/1984 | Mahabadi | 307/350 |
| 4,567,539 | 1/1986 | Sinberg | 361/92 |
| 4,584,623 | 4/1986 | Bello et al. | 361/33 X |
| 4,598,281 | 7/1986 | Maas | 340/664 |
| 4,621,313 | 11/1986 | Kitely | 363/49 |

Primary Examiner—Todd E. DeBoer
Attorney, Agent, or Firm—Dann, Dorfman, Herrell and Skillman

[57] ABSTRACT

A circuit for protecting electronic equipment such as computers, laser printers, fax machines, and the like from damage due to electrical transients associated with a temporary power interruption is connectable between a source of A.C. power and the electronic equipment. The circuit disconnects the equipment from the power source during a temporary power outage and maintains the equipment disconnected from the A.C. power until transients in the line voltage have abated. The circuit reconnects the equipment to the A.C. power source after a preselected time delay from the initial power interruption. The circuit keeps track of time during a power interruption without the use of batteries.

11 Claims, 3 Drawing Sheets

POWER SURGE PROTECTION CIRCUIT

FIELD OF THE INVENTION

This invention relates to protection of electronic equipment during a power system surge and more particularly to a circuit which prevents damage to electronic equipment from line voltage transients associated with a temporary power line interruption.

BACKGROUND OF THE INVENTION

Switched power supplies of the type used in personal computers, fax machines, laser printers and the like, include a rectifier circuit which charges a capacitor from the line voltage. In most equipment, the initial charging current is limited to a nondestructive value by a series-connected, negative-temperature-coefficient thermistor. When power is applied, the thermistor is in a high-resistance state. When the rectifier draws current, the thermistor heats up and its resistance reduces to a very low value. The thermistor stabilizes in the low resistance state when at an elevated temperature.

It has been found that such protective devices may not be effective during power system transients resulting from a fault due to lightning or to physical damage to the transmission system. Such transients are typically characterized by rapid on/off cycling brought about by an automatically reclosing circuit breaker attempting to reclose itself after opening in response to the fault.

A problem associated particularly with computers is that the computer hard disk drive will not have time to come to a complete stop if power is restored very quickly after a shutdown. It is desirable for the drive to come to a complete stop before power is restored in order to avoid damage to the drive's heads.

Heretofore, there have been known circuits directed to protecting computers and other electronic equipment from problems resulting from a power interruption. Those circuits, however, have left much to be desired. For example, one such circuit does not actually disconnect the computer from the line voltage. Consequently, it cannot prevent damage to the computer's power supply when A.C. power is restored rapidly after an interruption. Another such circuit turns off the computer, or other equipment, very rapidly, for example, within one power cycle. Such rapidity results in unnecessary shutdowns when the power interruption is only momentary. Moreover, none of the known circuits automatically reconnects the electronic equipment to the power line when power is restored after a shutdown.

SUMMARY OF THE INVENTION

The present invention recognizes that if power is interrupted momentarily and then reapplied, as by an automatically reclosing circuit breaker on the transmission line, a thermistor will not have time to return to its high-resistance state and thus cannot limit the inrush of charging current when power is suddenly reapplied. The current into the rectifier of the power supply is then limited only by the impedance of the power supply circuit including the effective resistance of the capacitor. Such current is dangerously high for the circuit components involved. Often a rectifier can handle one such episode, but, if there is a second surge while the rectifier is still hot from an earlier surge, failure of the power supply is likely.

In view of the foregoing problems associated with known protection circuits, it is a principal object of this invention to provide a surge protection circuit which disconnects a computer or other electronic device from the power source upon a power interruption and delays bringing the protected device back on line until it is safe to do so. Thus, when the power has been restored to normal the protected devices can be brought back on line without being damaged.

Another object of the present invention is to provide such a surge protection circuit which stores energy to provide a critical time delay during a power interruption without the use of batteries.

A further object of the present invention is to provide a surge protection circuit which connects the A.C. power source to the load immediately upon the initial turn-on or when re-energizing after an extended shutdown without the delay which the circuit provides during shorter power interruptions.

A still further object of the present invention is to provide a surge protection circuit which permits a predetermined grace period or time delay to pass before disconnecting the power source from the load in order to avoid unnecessary shutdowns when a power interruption is very short.

In accordance with the present invention, a circuit is provided for protecting electronic equipment from a line voltage transient resulting from a temporary power line interruption. Here and throughout this application the term "transient" is defined to mean a condition resulting from rapid on/off cycling of the A.C. power. The surge protection circuit according to the invention includes a power input circuit which receives the alternating current line voltage and provides first and second signals which are derived from the line voltage. The surge protection circuit also includes a power output circuit which is coupled to the input circuit for providing the line voltage to the protected electronic equipment. The power output circuit includes a normally open switch responsive to the first signal for respectively connecting and disconnecting the protected electronic equipment from the power line.

A control circuit, including a comparator circuit, a gated switch, and an energy storage device, controls operation of the normally open switch to provide power to the protected load or to isolate the load from the power source. The comparator circuit is responsive to the second signal and a reference signal, and provides a gate signal when the second signal has a predetermined relationship to the reference signal. The gated switch is responsive to the first signal and the gate signal, and transmits the first signal to the power output circuit to close the normally open switch. The power output circuit is thereby enabled to connect the protected electronic equipment to the line voltage when the switch is closed.

Concurrently, the first signal is transmitted to the comparator through the gated switch such that the first signal, when so provided, constitutes the reference signal. An energy storage device is coupled to the comparator so as to receive the first signal. The energy storage device charges up to the level of the first signal when the first signal is provided to the comparator means.

When power is momentarily interrupted and then restored before the first signal has decayed to a minimum limit, the normally open switch remains closed and no interruption occurs, thereby providing a grace period or first time delay to prevent an unnecessary interruption.

When a power interruption occurs that is longer in duration than the first time delay, the first signal decays to zero and the normally open switch is re-opened, thereby isolating the electronic equipment from the A.C. power source. The normally open switch remains in the open position for a second time delay after power is interrupted. The concurrent interruption of the first signal causes the energy storage device to discharge at a preselected rate so as to provide the reference signal. The discharge rate of the storage device is selected to provide the second time delay which is long enough for a line voltage transient associated with the power line interruption to substantially abate.

If power is not restored until after the second time delay, the first signal is applied to the power output circuit and the normally open switch is closed to provide A.C. power to the load.

BRIEF DESCRIPTION OF THE DRAWINGS

The foregoing summary, as well as the following detailed description of a preferred embodiment of the invention will be better understood in conjunction with the appended drawings in which.

DETAILED DESCRIPTION OF THE PREFERRED EMBODIMENT

Figure 1:
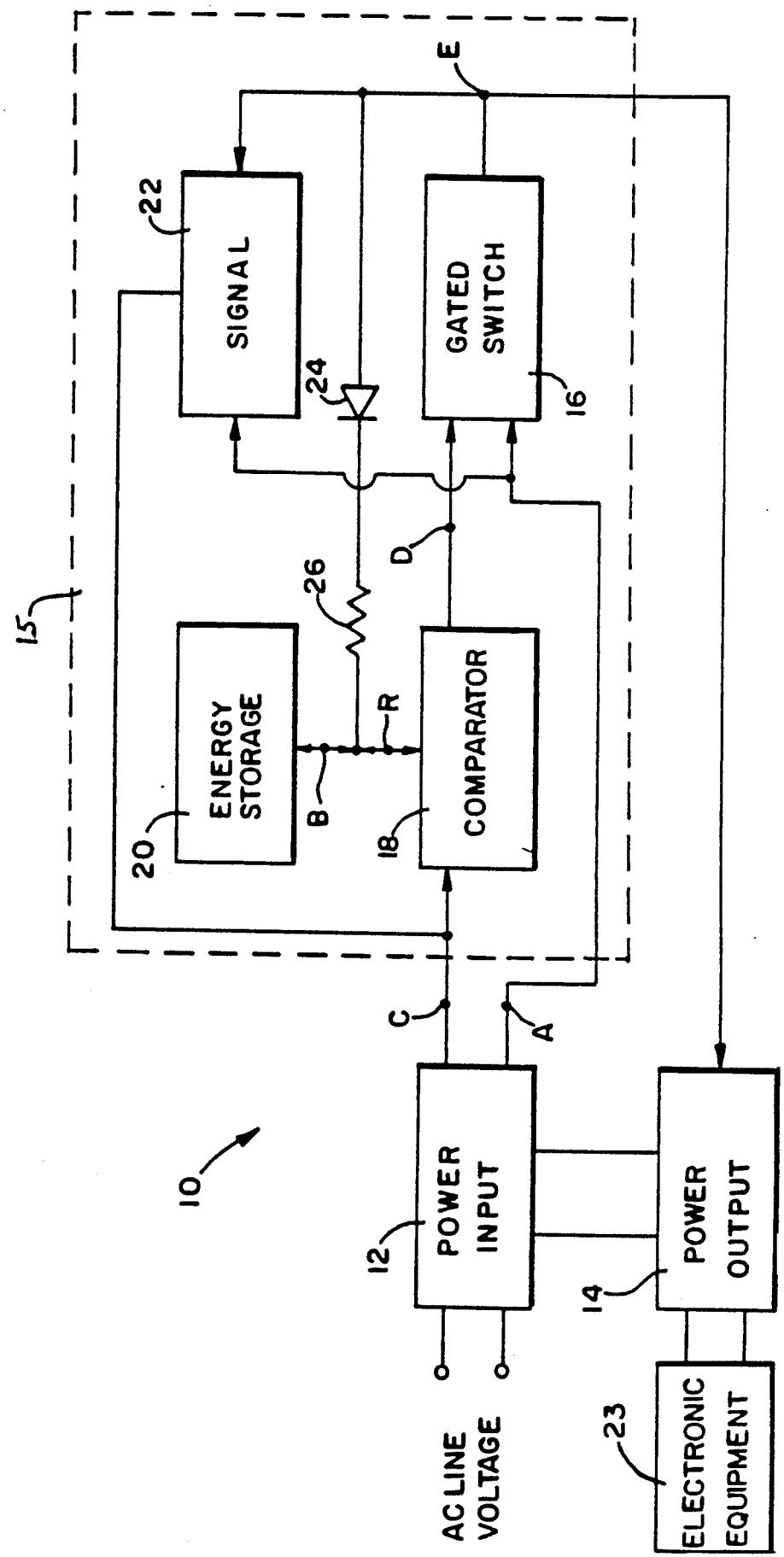
FIG. 1 is a block diagram and partial schematic of a preferred embodiment of the surge protection circuit according to the present invention.

Referring now to the drawings wherein like reference numerals indicate the same or corresponding parts throughout the various figures, and in particular to FIG. 1, there is shown a surge protection circuit 10 according to the present invention. The surge protection circuit 10 has a power input circuit 12, a power output circuit 14, and a control circuit 15 including a gated switch 16, a comparator circuit 18, and an energy storage device 20. An optional signaling circuit 22 can be provided in the control circuit 15 to indicate to an operator that power is available and that the surge protection circuit 10 is timing down to reconnect the electronic equipment after a power interruption.

The power input circuit 12 receives the A.C. line voltage, usually about 120 volts. The line voltage is provided to the power output circuit 14. Power input circuit 12 contains circuitry for providing a first or line signal A and a second or threshold signal C which are derived from the A.C. line voltage as will be described below. The power output circuit 14 is formed to be connected to an external electronic equipment 23 such as a computer, fax machine, or laser printer. The power output circuit 14 includes switching means for opening and closing at least one leg of the A.C. line.

The gated switch 16 receives the line signal A from power input circuit 12. The comparator circuit 18 receives the threshold signal C from power input circuit 12 and also receives a reference signal R which has a peak level of about equal magnitude to the line signal A. The comparator circuit 18 compares the threshold signal C and the reference signal R and provides a gate signal D to gated switch 16 when the threshold signal C and reference signal R have a predetermined relationship. In the preferred embodiment, the gate signal D is provided when threshold signal C is greater than or equal to the reference signal R.

Upon receiving the gate signal D, gated switch 16 transmits the line signal A as an energizing signal E. Energizing signal E is transmitted to power output circuit 14 to control the switching means therein. Signal E is also transmitted through the charging diode 24 and resistor 26 to comparator 18 as reference signal R and to energy storage device 20. Charge signal B represents the voltage across the energy storage device 20. As will be described more fully hereinbelow, when the energy storage device 20 is fully charged, the charge signal B is at the peak level of line signal A.

The signaling circuit 22, receives the line signal A, when activated, and provides an audible or visual signal to indicate to the operator that the surge protection circuit has shut down the protected electronic equipment 23 and is timing down to restore power thereto. The signaling circuit 22 also provides a notching signal to the comparator circuit 18 which aids that circuit in sampling the reference signal R, as will be explained more fully below.

Figure 2:
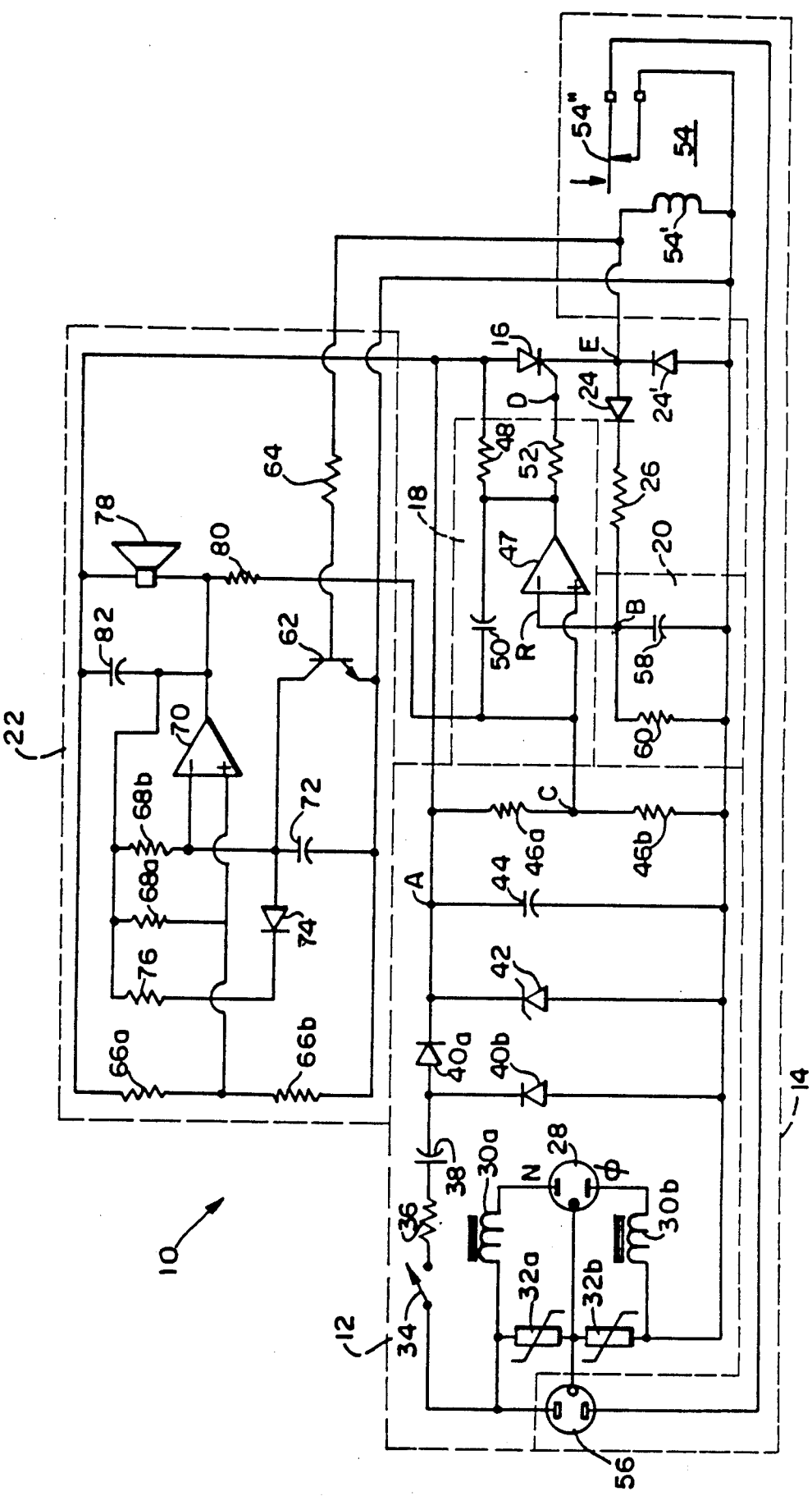
FIG. 2 is a schematic diagram of a preferred embodiment of the present invention.

Referring now to FIG. 2 there is shown a preferred circuit scheme for the surge protection circuit 10 of FIG. 1. The power input circuit 12 includes a three conductor connector 28 which can be embodied, for example, as a three-pronged, male connector. Current limiting inductors 30a and 30b and current control varistors 32a and 32b are connected in a known configuration to both the neutral (N) and phase ($\phi$) of connector 28 to protect the power input circuit from the adverse effect of power surges. The power input circuit 12 includes an on-off switch 34, which is located in the surge protection circuit 10 proper or remotely therefrom. A current limiting resistor 36 and capacitor 38 are connected to the circuit-side of the on-off switch 34. A rectifier circuit including diodes 40a and 40b is connected in a known configuration across the A.C. line voltage at the circuit-side terminal of capacitor 38. A zener diode 42 is connected across the terminals of the rectifier in order to clamp the rectified voltage to a preselected level, for example 24 volts D.C. A filter capacitor 44 is connected across the terminals of the zener diode 42 to filter out ripple effects of the rectified voltage and thereby to provide an essentially D.C. line signal, A, derived from the A.C. line voltage. A voltage divider, including resistors 46a and 46b, is connected across the terminals of filter capacitor 44. The resistance values of resistors 46a and 46b are selected to provide a threshold signal C between the resistors which has a high enough level for the comparator circuit 18 to be responsive.

The comparator circuit 18 includes an electronic comparator 47 having a noninverting input (+) terminal and an inverting input (−) terminal. The threshold signal C is provided to the noninverting input of electronic comparator 47. The reference signal R is provided to the inverting input of electronic comparator 47. When threshold signal C is greater than the reference signal R, the output of the electronic comparator 47 is a high level output or a high state. A capacitor 50 is connected between the output of electronic comparator 47 and its noninverting input to assure that the output of the electronic comparator 47 goes to the high state. When the output of comparator 47 is in the high state, current flows through resistor 48, which is connected between the comparator output and the line signal A, and resistor 52, which is connected between the comparator output and the gated switch 16.

In the embodiment shown in FIG. 2, the gated switch 16 is embodied as a silicon controlled rectifier (SCR), sometimes known as a unidirectional thyristor. The anode of SCR 16 is connected to the line signal A. The cathode of SCR 16 is connected to the power output circuit 14 and to the energy storage circuit 20.

The energy storage circuit 20 includes a capacitor 58 having a terminal connected to the charging resistor 26 and the inverting input terminal of electronic comparator 47. A bleed-off resistor 60 is connected across the capacitor 58. The capacitance of capacitor 58 and the resistance of bleed-off resistor 60 are selected to provide a decay time substantially longer than that of the RC circuit comprising capacitor 44 and the effective resistance of SCR 16 and relay coil 54'.

The power output circuit 14 has a three conductor connector 56, for example, a three-conductor, female connector, into which an external electronic device can be plugged. One terminal of connector 56 is connected to the neutral terminal of connector 28 through the inductor 30a and varistor 32a. The common terminal of connector 56 is connected to the corresponding common terminal of connector 28. The third or phase terminal of connector 56, however is connected to the contacts 54" of a relay 54. The coil 54' of relay 54 is connected to the cathode of SCR 16. The contacts 54" are normally open. A diode 24' is also connected to the cathode of SCR 16 across the relay coil 54' in order to suppress any significant reverse emf, often referred to as kick-back voltage, from the relay coil 54' during initial energizing of the surge protection circuit 10.

In the embodiment shown in FIG. 2, the surge protection circuit 10 includes a signaling circuit 22 for providing an audible signal to indicate that, after a short interruption, the surge protector has power available and is timing down to restore power to the external device. The use of the signaling circuit 22 is preferred because it permits the use of less sensitive components, which are also less expensive, in the comparator 18 without sacrificing reliable operation.

The signaling circuit 22 includes a switching transistor 62 having its base connected to the relay coil 54' through a coupling resistor 64. A pair of resistors 66a and 66b are connected as a voltage divider across the line signal A. The values of 66a and 66b are selected to divide the line signal A so as to provide a threshold level signal from between resistors 66a and 66b to the noninverting input terminal of an electronic comparator 70. A pair of feedback resistors 68a and 68b are connected between the output terminal and the noninverting and inverting input terminals respectively of comparator 70. A capacitor 72 is connected to the inverting input of comparator 70, the switching transistor 62, and a diode 74. The diode 74 has its cathode connected to a resistor 76 which is connected to each of the feedback resistors 68a and 68b. An audible device 78, such as a piezoelectric beeper, is connected between the line signal A and the output of comparator 70. A coupling resistor 80 connects the output of comparator 70 to the noninverting input of comparator 47. A filter capacitor 82 is connected between the line signal A and the output terminal of comparator 70.

Figure 3:
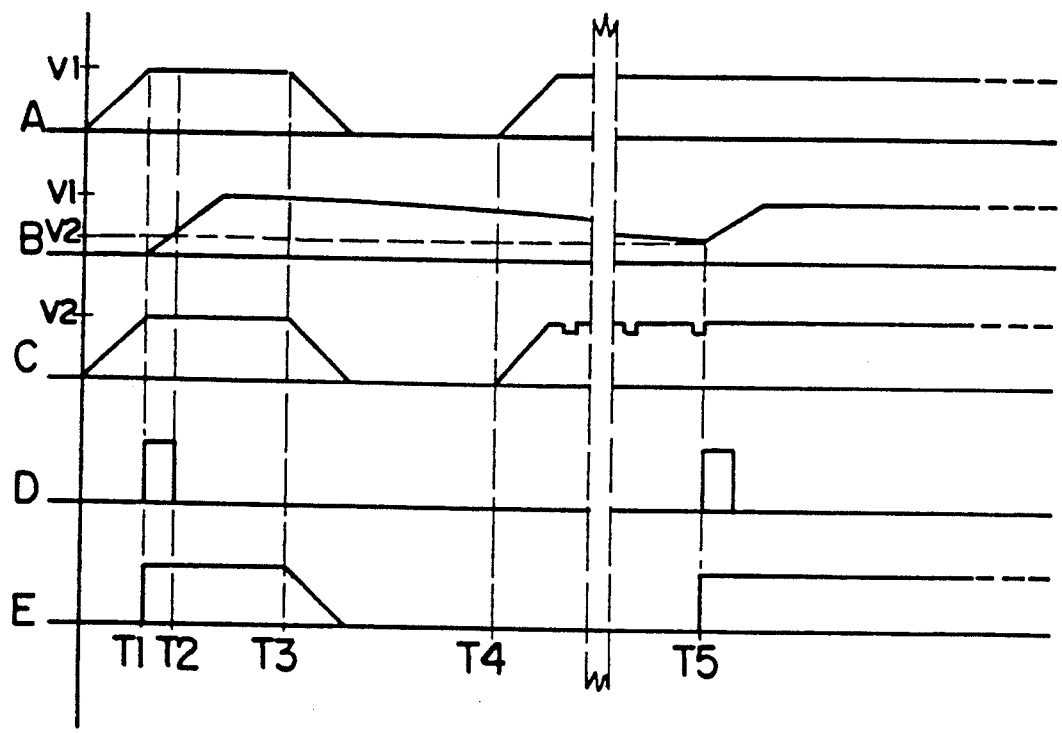
FIG. 3 is a timing diagram illustrating the operation of the circuit of FIG. 2.

The operation of the surge protection circuit 10 according to the present invention may be better understood from the following description when read in connection with FIGS. 2 and 3. The surge protection circuit is initially energized by plugging the connector 28 into an electrical receptacle, for example a wall outlet. When the switch 34 is closed, the circuit becomes energized through the inductor/varistor surge protectors 30a, 32a, and 30b, 32b. The A.C. current in the neutral leg passes through the switch 34, current limiting resistor 36 and capacitor 38. The A.C. line voltage is rectified by means of the diodes 40a and 40b and then clamped by means of the zener diode 42 to a preselected D.C. level, for example 24 volts. The rectified voltage is applied to filter capacitor 44 which becomes charged to the level of the rectified line signal A. This is represented in FIG. 3 on the timing line marked "A" which shows the voltage build-up in capacitor 44 to the peak level, vl, of line signal A. The charging time is relatively short, being on the order of about 400 to 600 milliseconds.

At time T1 the line signal A reaches the peak level V1 and the threshold signal C reaches the threshold level, V2, of comparator 47 as shown on timing line "C". Until time T1 capacitor 58 is uncharged and the reference signal R, as indicated on timing line "B", is substantially zero. Accordingly, the output of comparator 47 goes high as shown on timing line "D", thereby triggering the SCR 16. When triggered, the SCR begins to conduct and transmits the line signal A to the relay coil 54'. When the relay coil 54' is energized, it closes the contacts 54" completing the A.C. circuit between input connector 28 and output connector 56. The A.C. line voltage is thereby provided to the external electronic equipment 23, such as a computer or the like that is plugged into connector 56. Concurrently, the timing capacitor 58 begins to charge up to the level vl as shown on timing line "B" of FIG. 3.

As timing capacitor 58 charges, the voltage at its terminal B increases to a level that is greater than the threshold signal C. When that level is reached, the comparator output goes to a low state as shown at time T2 on line "D", and the gate signal D to SCR 16 is thereby removed. However, as long as the magnitude of signal A is at least at the latching level of SCR 16, SCR 16 continues to conduct and relay 54 remains closed.

If the A.C. line voltage is temporarily interrupted at time T3, SCR 16 stops conducting after a short time delay as shown on timing line "E" and does not restart even when the line voltage is restored as at time T4 to return the line signal A to the level V1. The voltage across capacitor 58, reference signal R, begins to decay as the charge bleeds off through resistor 60. See timing line "B".

For a period of time, depending on the decay constant of the energy storage circuit 20, the reference signal R remains above the level V2 of the threshold signal C. The relay 54, which has become de-energized, remains open. As shown in FIG. 3, line "B", the reference signal R continues to decay with time and at time T5, when it falls slightly below the level V2 of the threshold signal C, the output of comparator 47 goes high, retriggering the SCR 16 and re-energizing the relay 54. Power is thereby restored to the external electronic equipment 23. The time interval from T3 to T5 constitute delay that is long enough for a line voltage transient associated with a power line interruption to abate. This time delay has a duration selected, for example, to permit the varistor in a power supply to return to its high impedance state or to permit a hard disk drive to spin down.

It is important to note that the decay constant of the RC circuit consisting of capacitor 44 and the effective resistance of SCR 16, is selected to provide a short "grace" period after T3 which constitutes a time delay, on the order of several milliseconds, within which, if A.C. power is restored, the SCR 16 continues to conduct, relay 54 remains closed, and the protected load is not isolated from the line voltage.

When relay 54 is not energized, but A.C. line voltage is available at connector 28, the signaling circuit 22 becomes operational. Signaling circuit 22 is configured as a low frequency, short-duty cycle oscillator which drives an audible or visible device. A.C. line voltage being available, line signal A is present across resistors 66a and 66b. The oscillator's cycle begins with the threshold level signal being present at the noninverting input terminal of comparator 70. The output of the comparator 70 goes to a high state. The level of the threshold signal is pulled up by a feedback signal through resistor 68a. The signal level at the noninverting input terminal is then higher than the signal level at the inverting input terminal and resistor 68b begins to conduct.

The base of switching transistor 62 is "on" when the relay coil 54' is energized. In that state the switching transistor 62 conducts current and is effectively a shunt around capacitor 72. When the relay coil 54' is not energized, the base of switching transistor 62 is "off" and transistor 62 stops conducting, becoming effectively an open-circuit. Capacitor 72 can then be charged up.

When the voltage level across capacitor 72 becomes greater than the level of the signal at the noninverting input terminal of comparator 70, the output of comparator 70 goes to a low state. Capacitor 72 then discharges through diode 74, resistor 76 and resistor 68a. In this manner the signal level at the noninverting input terminal of comparator 70 is pulled up higher than that at the inverting input terminal. When the signal level at the noninverting input is greater than that at the inverting input, the comparator output goes to a high state again, restarting the cycle.

Each time the output of comparator 70 goes to the low state a voltage drop develops across piezoelectric beeper 78. Piezoelectric beeper 78 emits an audible signal at each such instance. Furthermore, when the output of comparator 70 goes to the low state, the level of the threshold signal C is pulled down or notched for a short interval. The notch in the threshold signal C permits the reference signal R to drop below the threshold level for comparator 47. When the threshold signal C returns to its normal level there is a sufficient offset in the levels of the threshold signal C and reference signal R to cause comparator 47 to go to its high state. As previously described, the SCR 16 is thereby triggered and power is restored to the output connector 56 and in turn to the electronic equipment 23 connected thereto.

Figure 4:
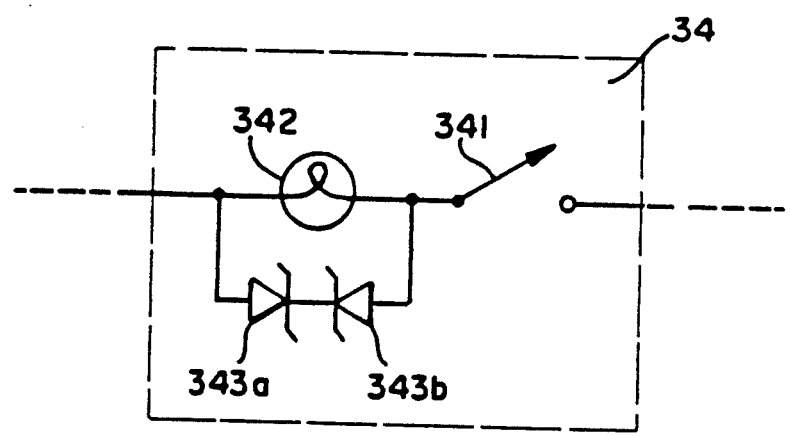
FIG. 4 is a schematic diagram of a further embodiment of the remote on-off switch 34 of the circuit of FIG. 2.

Referring now to FIG. 4, there is shown an alternate embodiment of the on-off switch 34 of surge protection circuit 10. It is often desirable to have an indication of the status, i.e., on or off, of the switch 34. Such objective is easily accomplished by connecting a lamp 342 in series with the switch. However, the problem arises that when the lamp 342 burns out or its filament is broken, an open-circuit results disconnecting the surge protection circuit from the line voltage. The surge protection circuit 10 cannot be used in that case until the lamp 342 is replaced.

A pair of zener diodes 343a and 343b are connected across the lamp 342. The anodes of the zener diodes are connected to respective terminals 344a and 344b of the lamp and the cathodes are connected together. This arrangement permits the lamp 342 to operate normally, but, if the lamp should burn out or break, a circuit is provided to maintain continuity of operation.

Some of the many novel features and advantages of the surge protection circuit according to the present invention are now apparent in view of the foregoing description. For example, a novel surge protection circuit has been described which disconnects a protected electronic device from the A.C. power source upon a power line interruption, and which, when power is restored, maintains the device disconnected for a short time delay until transients in the line voltage have substantially abated. The surge protection circuit stores energy to keep track of time during a shutdown, but does not need batteries to do so. The surge protection circuit is designed to permit a short grace period to elapse before disconnecting the protected electronic device in order to avoid unnecessary shutdowns when the power line interruption is very short. The circuit design provides power to the load without a time delay during initial turn-on or when re-energizing after an extended power interruption.

It will be recognized by those skilled in the art that changes or modifications may be made to the above described embodiment without departing from the broad inventive concepts of the invention. It is understood, therefore, that the invention is not limited to the particular embodiments which are disclosed but are intended to cover all modifications and changes which are within the scope and spirit of the invention as defined in the appended claims.

What is claimed is:

1. Apparatus for protecting electronic equipment from a line voltage transient resulting from a temporary power line interruption comprising:
   power input means for receiving alternating current line voltage and providing first and second signals derived from the line voltage;
   power output means operatively connected to said power input means for connecting the line voltage to the protected electronic equipment, said power output means including a normally open switch responsive to said first signal for connecting the electronic equipment to the power line and responsive to the interruption of said first signal for disconnecting the protected electronic equipment from the power line;
   signal comparing means responsive to said second signal and a reference signal for providing a gate signal when said second signal has a predetermined relationship to said reference signal;
   gated switch means responsive to said first signal and said gate signal for transmitting said first signal to said power output means and to said signal comparing means such that said first signal, when so transmitted, constitutes the reference signal; and
   energy storage means coupled to said signal comparing means and responsive to said first signal such that (a) said energy storage means is charged up to the level of said first signal when said first signal is transmitted to said signal comparing means, and (b)

said energy storage means is discharged at a preselected rate so as to provide the reference signal after a power line interruption when said second signal is interrupted from said signal comparing means;

said discharge rate being selected to provide a time delay after the power line interruption during which the electronic equipment is maintained disconnected from the power line.

2. Apparatus as recited in claim 1 wherein said power output means comprises power switching means including means for sensing said first signal and contacting means operatively connected to said sensing means for opening the connection between said power output means and said power input means when said first signal is interrupted.

3. Apparatus as recited in claim 1 wherein said comparator means is configured to provide the gate signal when said second signal is greater in magnitude than the reference signal.

4. Apparatus as recited in claim 1 further comprising signaling means responsive to said first signal for providing a perceptible signal when the electronic equipment is disconnected from the power line but the line voltage is restored to said power input means before said energy storage means has fully discharged.

5. Apparatus as recited in claim 1 wherein said energy storage means comprises:

a capacitor having one terminal connected to said comparator means and said gated switch means; and a resistor connected in parallel with said capacitor;

said capacitor and resistor having respective values of capacitance and resistance to provide an RC time constant sufficient to obtain at least the selected discharge rate.

6. Apparatus as recited in claim 1 wherein said power input means comprises:

rectifying means for converting the alternating current line voltage to an essentially direct current line signal having a preselected level, said line signal constituting the first signal; and voltage dividing means coupled to said rectifying means for providing a threshold signal having a level at a preselected fraction of the line signal, said threshold signal constituting the second signal.

7. Apparatus as recited in claim 6 wherein said signal comparing means comprises:

an electronic comparator having first and second input terminals and an output terminal, said first input terminal being coupled to said voltage dividing means, said second input terminal being coupled to said energy storage means, and said output terminal being coupled to said rectifying means and to said gated switch.

8. Apparatus as recited in claim 6 wherein said power input means further comprises:

an electrical connector for coupling said power input means to a source of alternating current line voltage; and a switch connected between said electrical connector and said rectifying means for connecting and disconnecting said rectifying means from the A.C. line voltage.

9. Apparatus as recited in claim 8 wherein said switch comprises:

an indicating lamp for indicating that the rectifying means is connected to the A.C. line voltage, said indicating lamp having a pair of terminals; and a pair of zener diodes each having an anode and a cathode, said zener diodes being connected across the terminals of said indicating lamp such that the anodes are coupled to the respective lamp terminals and the cathodes are connected together.

10. Apparatus as recited in claim 1 wherein said power output means includes:

a power connector having at least two terminals for receiving a mating connector associated with the electronic equipment; and a relay including a coil and a pair of contacts, said coil being operatively connected to the gated switch for receiving the first signal, one of said contacts being connected to said power input means for receiving one leg of the A.C. line voltage and the other contact being connected to a terminal of said power connector.

11. Apparatus as recited in claim 4 wherein said signaling means comprises:

an oscillating circuit for switching between a first state and a second state;

a signal emitting device coupled to said oscillating circuit for emitting the perceptible signal when said oscillating circuit is in one of said first or second states; and means responsive to said first signal for turning on said oscillating circuit.

* * * * *

UNITED STATES PATENT AND TRADEMARK OFFICE
CERTIFICATE OF CORRECTION

PATENT NO. : 4,999,728
DATED : March 12, 1991
INVENTOR(S) : RICKY L. CURL

It is certified that error appears in the above-identified patent and that said Letters Patent is hereby corrected as shown below:

Column 6:

Line 19: "vl" should read --V1--;

Line 37: "vl" should read --V1--; and

Line 66: "constitute delay" should read --constitutes a time delay--.

Signed and Sealed this

First Day of September, 1992

Attest:

DOUGLAS B. COMER

Attesting Officer

Acting Commissioner of Patents and Trademarks